US008851025B2

(12) United States Patent
Voisin

(10) Patent No.: US 8,851,025 B2
(45) Date of Patent: Oct. 7, 2014

(54) POWERING AN INTERNAL COMBUSTION ENGINE

(76) Inventor: Ronald D. Voisin, Fremont, CA (US)

( * ) Notice: Subject to any disclaimer, the term of this patent is extended or adjusted under 35 U.S.C. 154(b) by 1283 days.

(21) Appl. No.: 12/568,034

(22) Filed: Sep. 28, 2009

(65) Prior Publication Data
US 2010/0077987 A1 Apr. 1, 2010

Related U.S. Application Data

(60) Provisional application No. 61/173,355, filed on Apr. 28, 2009, provisional application No. 61/166,260, filed on Apr. 3, 2009, provisional application No. 61/100,295, filed on Sep. 26, 2008.

(51) Int. Cl.
F02B 47/02 (2006.01)
F02G 3/00 (2006.01)
F02B 33/22 (2006.01)

(52) U.S. Cl.
CPC ............... F02B 33/22 (2013.01); Y02T 10/121 (2013.01); F02B 47/02 (2013.01)
USPC ..... 123/25 R; 123/25 A; 123/25 C; 123/25 P; 60/616

(58) Field of Classification Search
USPC ......... 123/320, 25 C, 25 R, 25 F, 25 A, 25 Q; 60/616, 617, 620
See application file for complete search history.

(56) References Cited

U.S. PATENT DOCUMENTS 1,347,087 A 7/1920 Gernandt
2,791,881 A 5/1957 Denker
3,251,183 A * 5/1966 Whitlow .................. 60/514
3,623,463 A 11/1971 DeVries
3,958,540 A * 5/1976 Siewert .................. 123/58.8
3,964,263 A 6/1976 Tibbs (Continued)

FOREIGN PATENT DOCUMENTS

DE 102005007245 4/2006
EP 0006747 9/1980

OTHER PUBLICATIONS

International Search Report, dated Nov. 30, 2009.

Primary Examiner — Lindsay Low
Assistant Examiner — Syed O Hasan
(74) Attorney, Agent, or Firm — Carlson, Gaskey & Olds P.C.

(57) ABSTRACT

Downstream expansion cylinders are associated with a combustion cylinder such that an overall surface area and displacement volume of the expansion cylinder is sufficient to lower the temperature of fluids associated with the combined engine to such an extent that a radiator can be eliminated in an associated vehicle, or other system. In a separate feature, a catalytic material is placed on surfaces which will "see" the hot exhaust gases such that catalytic conversion of impurities in the gases can be achieved within the engine itself. In yet another feature, water is recovered from a system having both a water injection expansion cylinder, and a combustion cylinder, and the recovered water is re-used for the expansion. In yet another feature, gearing is provided between the expansion cylinder and a combustion cylinder such that the output of the combined engine is optimized, and the two cylinders do not drive the crankshafts in a one-to-one fashion. In another feature the combustion cylinder's ignition timing is delayed (retarded) to manage thermal control of said combustion cylinder between it and a subsequent expansion cylinder or cylinders.

1 Claim, 8 Drawing Sheets

(56) References Cited

U.S. PATENT DOCUMENTS

| | | |
|---|---|---|
| 4,075,980 A | 2/1978 | Anger |
| 4,159,699 A | 7/1979 | McCrum |
| 4,159,700 A | 7/1979 | McCrum |
| 4,286,565 A * | 9/1981 | Santi ............... 60/278 |
| 4,503,816 A | 3/1985 | Gijbels et al. |
| 4,552,106 A | 11/1985 | Spence |
| 4,577,611 A | 3/1986 | Hagino |
| 4,663,938 A | 5/1987 | Colgate |
| 5,035,115 A * | 7/1991 | Ptasinski ............... 60/712 |
| 5,072,589 A | 12/1991 | Schmitz |
| 5,400,751 A | 3/1995 | Grimmer et al. |
| 5,566,549 A | 10/1996 | Clarke |
| 5,638,777 A * | 6/1997 | Van Avermaete ............ 123/52.4 |
| 6,095,100 A * | 8/2000 | Hughes ............... 123/25 C |
| 6,202,416 B1 | 3/2001 | Gray, Jr. |
| 6,205,962 B1 * | 3/2001 | Berry, Jr. ............... 123/73 A |
| 6,318,310 B1 | 11/2001 | Clarke |
| 6,527,671 B2 | 3/2003 | Paalasmaa et al. |
| 6,553,977 B2 | 4/2003 | Schmitz |
| 7,021,272 B2 | 4/2006 | Singh |
| 7,191,760 B2 * | 3/2007 | Watanabe et al. ........ 123/406.24 |
| 8,082,892 B2 * | 12/2011 | Zhao et al. ............... 123/25 P |
| 2004/0099887 A1 | 5/2004 | Hazelton |
| 2007/0022977 A1 | 2/2007 | Crower |
| 2007/0209609 A1 | 9/2007 | Shimada et al. |

* cited by examiner

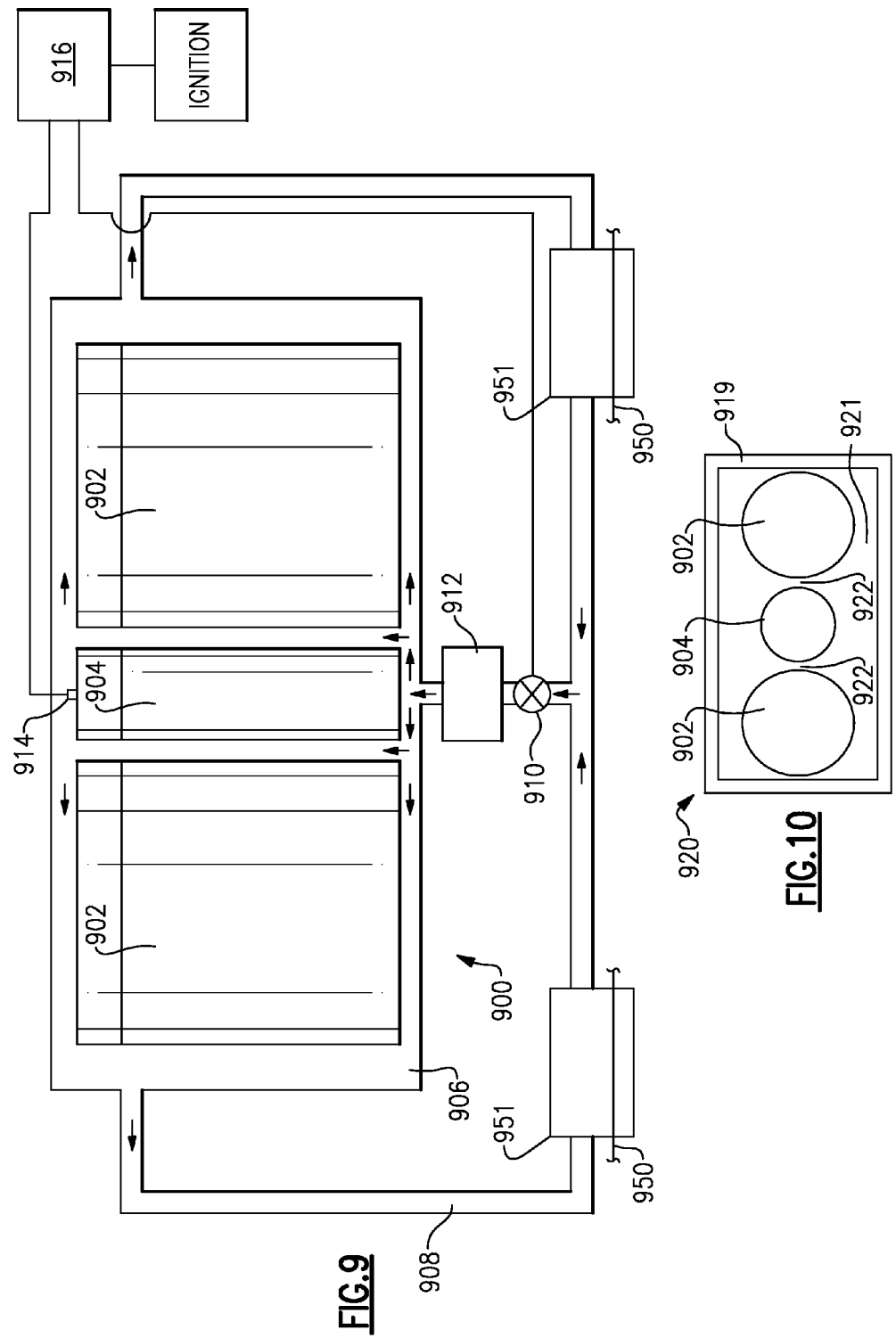

POWERING AN INTERNAL COMBUSTION ENGINE

The application claims priority to U.S. Provisional Application No. 61/173,355, which was filed on Apr. 28, 2009, U.S. Provisional Application No. 61/166,260, which was filed on Apr. 3, 2009, and U.S. Provisional Application No. 61/100,295, which was filed on Sep. 26, 2008.

BACKGROUND OF THE INVENTION

Internal combustion engines contain multiple cylinders. Exhaust gas is generated when a fuel and air mixture is ignited and expanded within a cylinder to drive a piston. The exhaust gas is typically vented from the cylinders through an exhaust stroke to the atmosphere. The exhausted gas typically has a very high temperature when leaving the cylinders. In some proposed systems, the exhaust gas is delivered to a second cylinder for further expansion.

Some internal combustion engines have injected water into the same cylinder performing combustion with fuel and air intake.

There has also been a proposal for a combined engine that has a combustion cylinder mounted upstream of an expansion cylinder. The expansion cylinder receives hot exhaust gas from the combustion cylinder, and also receives a source of water that is expanded into steam by the hot exhaust gas to create further drive for a common crankshaft.

While this proposed system has good potential, there are many improvements that would make the system more practical.

SUMMARY OF THE INVENTION

In features of this invention, downstream expansion cylinders are associated with a combustion cylinder to provide an overall surface area and volumetric displacement of expansion cylinders sufficient to lower the temperature of fluids associated with the combined engine to such an extent that a radiator can be eliminated in an associated vehicle, or other system.

In a separate feature, a catalytic material is placed on surfaces which will "see" the hot exhaust gases such that catalytic conversion of impurities in the gases can be achieved within the engine itself.

In yet another feature, water is recovered from a system having both a water injection expansion cylinder, and a combustion cylinder, and the recovered water is re-used for the expansion.

In yet another feature, gearing is provided between an expansion cylinder and a combustion cylinder such that the output of the combined engine is optimized, and the two cylinders do not drive the crankshaft in a one-to-one fashion.

BRIEF DESCRIPTION OF THE DRAWINGS

FIG. 9 shows a water cooling system incorporated into this invention.
FIG. 10 shows another embodiment of the water cooling system.

DETAILED DESCRIPTION

Figure 1:
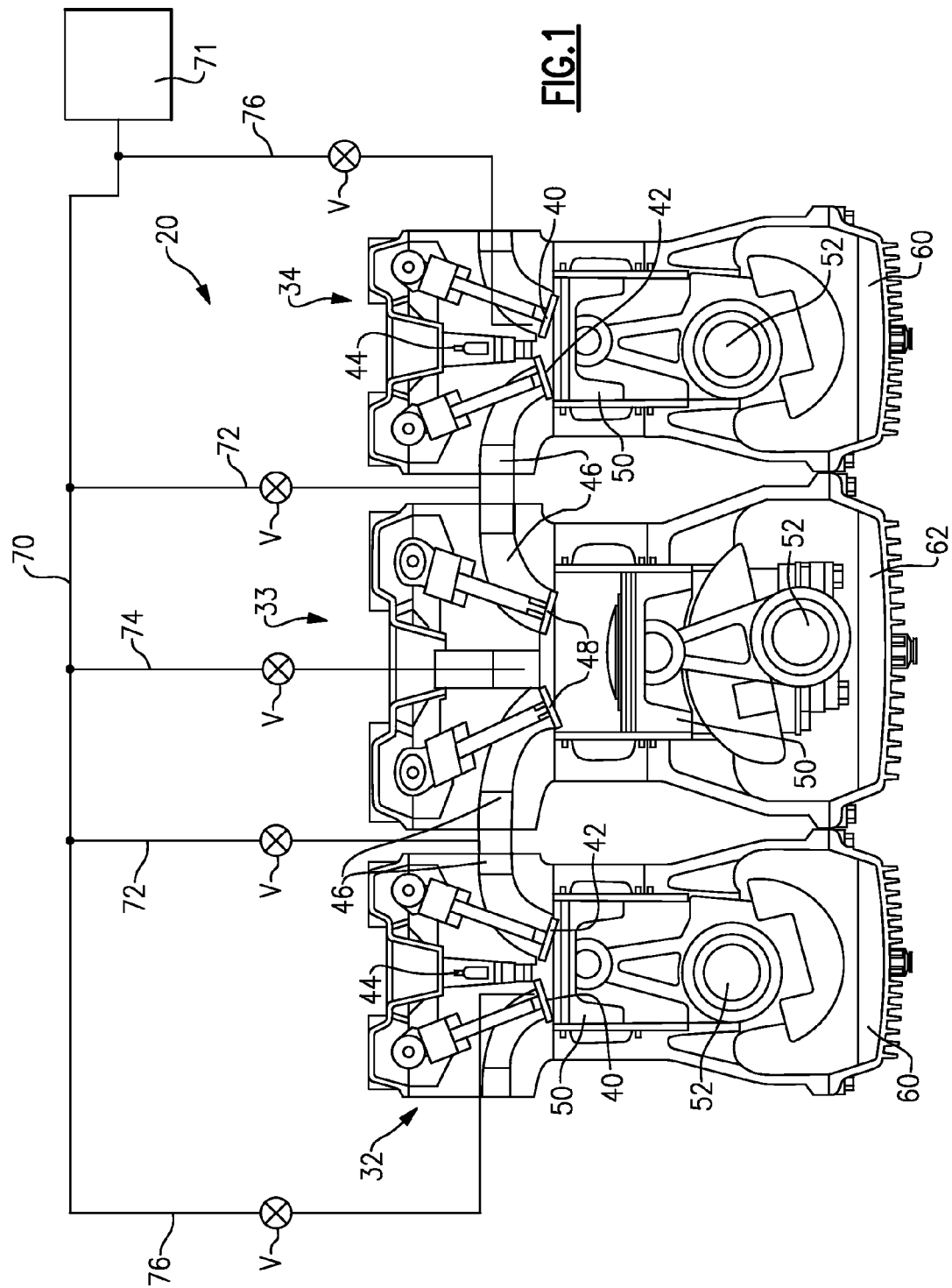
FIG. 1 schematically shows a first embodiment engine.

An engine 20 is illustrated in FIG. 1, and incorporates combustion cylinders 32 and 34, which are mounted adjacent to an expansion cylinder 33. Each of the cylinders include pistons 50, which are driven to drive a common crankshaft 52. Although the cylinders are shown in side-by-side relationship, in practice, they will be inline such that the common crankshaft 52 is driven by each of the pistons 50. Of course, other configurations can be used.

The cylinders 32 and 34 are combustion cylinders and are shown having spark plugs 44. However, other combustion cylinders which do not require spark plugs would also benefit from the teachings of this application.

As shown, intake valves 40 control the flow of air and fuel into the cylinders 32, 34, in some engine types, such as Diesel, the fuel may be directly injected into the cylinders. The combined air and fuel is compressed, ignited, and exhausted through exhaust valves 42 into an associated exhaust line 46. The cylinders 32 and 34 may be four-stroke cylinders, and will operate as known, at least as described to this point.

Inlet valves 48 on the expansion cylinder 33 alternately operate in sync with the alternating operation of valves 42 and receive the hot, high pressure exhaust from the exhaust lines 46. The gases at least partially drive the larger displacement piston 50 associated with the expansion cylinder 33 in a two-stroke fashion. As known, the cylinders 32 and 34 will be out of phase by 360°. Cylinder 33 has a final exhaust valve not shown.

A water injection system 70 takes water from a source of water 71 and injects it into the engine at any one of several possible locations. As shown, the water may be injected through line 72 into the exhaust line 46. Water may be injected through line 74 to the top of the cylinder of the expansion cylinder 33. The water may be injected as shown at 76 into the top of cylinders 32, 34. If injected into the cylinders 32 and 34, it is preferred that the water be injected late in an exhaust cycle.

The water injection and metering can be performed in much the same way as high pressure fuel injection is commonly performed in a diesel engine, for example. The injection of water is estimated to be at a rate of 1 to 2 times the rate of fuel consumption for a gasoline engine. The water can be injected into the expansion cylinder 33 head at the time exhaust gases are being communicated to the expansion cylinder 33. Owing to a finite thermal absorption and vaporization delay for the heat of the ignition to vaporize the injected water, it may be beneficial in some cases to move the injection of the water forward in the process, into the exhaust passage 46, or into one of the cylinders as described above at 76. In the case of injecting the water into one of the combustion cylinders 32 or 34, this should occur at a mature point of the power-stroke, 160 degrees-175 degrees, past top dead center, for example.

Valves V are shown for controlling the flow of the injection of the water, and may be controlled by an overall engine control, in a manner that would be apparent to a worker of skill in this art.

While cam shafts are shown for controlling the operation of the several cylinder valves, other means of valve timing, such as electronic valve controls may be utilized.

Fuel and air fed combustion cylinders 32 and 34 may fire nominally at 0 degrees and 360 degrees of rotation respectively. The cylinders 32, 34 alternate intake and power strokes while the expansion cylinder 33 executes an exhaust stroke. During the exhaust stroke, gases exit the expansion cylinder through a valve, not shown. Each cylinder 32, 34 contributes torque to a crankshaft 52 through the power-stroke. The combustion cylinders 32, 34 alternate compression and exhaust strokes while the second cylinder 33 is executing a power stroke. In the power stroke, the piston 50 in the expansion cylinder is driven by expansion of the steam and exhaust gas. The expansion cylinder 33 expands the exhausted gas of the cylinder 32 beginning nominally at 180 degrees of rotation and then, after completing an exhaust stroke, the cylinder 33 alternately further expands the emission from the cylinder 34 beginning nominally at 540 degrees of rotation, in a two-stroke fashion.

In one example, displacement of the expansion cylinder 33 is four times that of the cylinders 32 or 34 (the displacements of the cylinder 32 and cylinder 34 may be nominally the same). Accordingly, the second cylinder 33 contributes significant positive torque to the crankshaft 52.

Oil pans 60 associated with the combustion cylinders 32 and 34 are shown. The sump 62 of the expansion cylinder may be sealed from the oil pans 60, and their combustion cylinders 32 and 34, such that water can collect, as will be described below.

Figure 2:
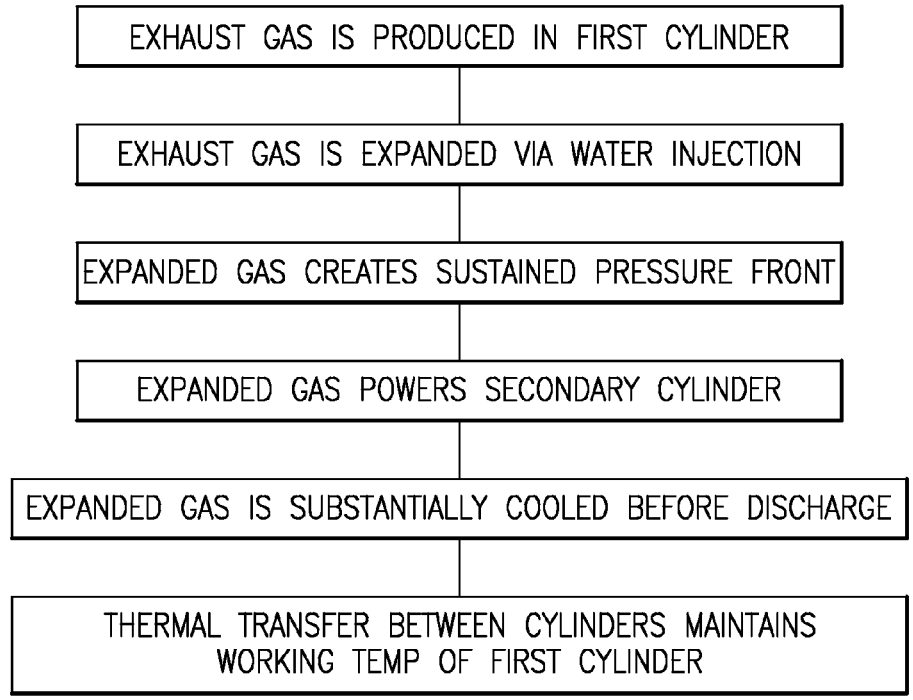
FIG. 2 is a flowchart of a basic system incorporating this invention.

FIG. 2 is a flowchart which briefly describes the above-described system. First, an exhaust gas is produced in a combustion cylinder. This exhaust gas is expanded along with water via a water injection process. The expanded gas creates a pressure front which drives the expansion cylinder piston. The expanded gas is substantially cooled before discharge. Thermal transfer between cylinders maintains the working temperature of the first cylinder.

Figure 3:
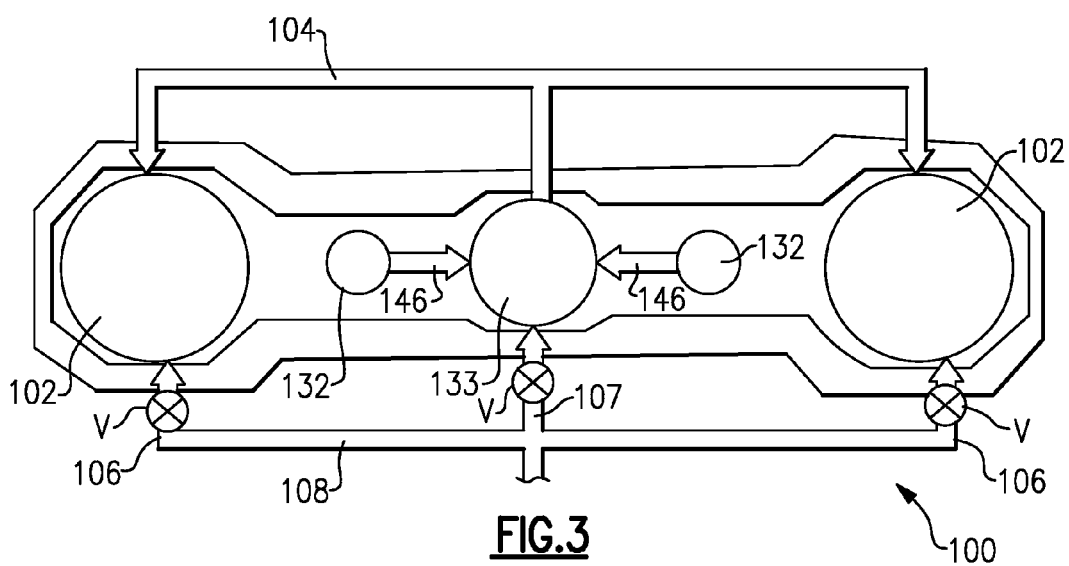
FIG. 3 shows a second embodiment system.

FIG. 3 shows a top down view of an embodiment 100 with combustion cylinders 132 associated with an expansion cylinder 133. An exhaust passage 146 connects cylinders 132 to cylinder 133. Additional downstream expansion cylinders 102 are provided, to provide a multi-stage cascade. As shown, the exhaust 104 from the expansion cylinder 133 delivers expanded exhaust gas into the cylinders 102.

In general, the use of the several expansion cylinders provides that the total surface area of expansion cylinders is sufficiently large that all, or the great majority, of the generated heat and energy can be recaptured prior to being exhausted to atmosphere. In this manner, the invention may allow the elimination of the radiator.

The pistons of the outer expansion cylinders 102 can have the same rotational phase as the four-stroke cylinders 132, respectively, and could be 180 degrees out of phase with the central two-stroke expansion cylinder 133. In this example, the need for ever larger displacement through a cascade is provided by having the combined displacement of the outer cylinders 102 be substantially greater than the displacement of the central cylinder 133, while the interior configuration may operate as previously described.

The example outer cylinders 102, may have bores that are larger than the central cylinder 133 by a factor of $\sqrt{2}$, causing a combined displacement four times larger than the first cascade in the central cylinder 133.

In one example, two outer cylinders 102 receive the exhausted gas. In other examples, cascading continues from cylinder 133 to a single downstream cylinder. The direction and number of cylinders receiving the exhaust is not limited. It is desirable that each downstream, or cascaded, cylinder has larger displacement than the cylinder providing exhaust gases.

Water injection can occur through a water injection line 108 which is shown injecting water into the first stage expansion cylinder at 107, and the second stage expansion cylinders 102 at 106. As will be described below, the several stage cascading as disclosed in the FIG. 3 embodiment allows the exhaust gas and water to be lowered to a very low temperature, and for a great majority of the potential energy generated by the combustion process to be captured as useful energy, rather than lost as wasted energy.

Figure 4:
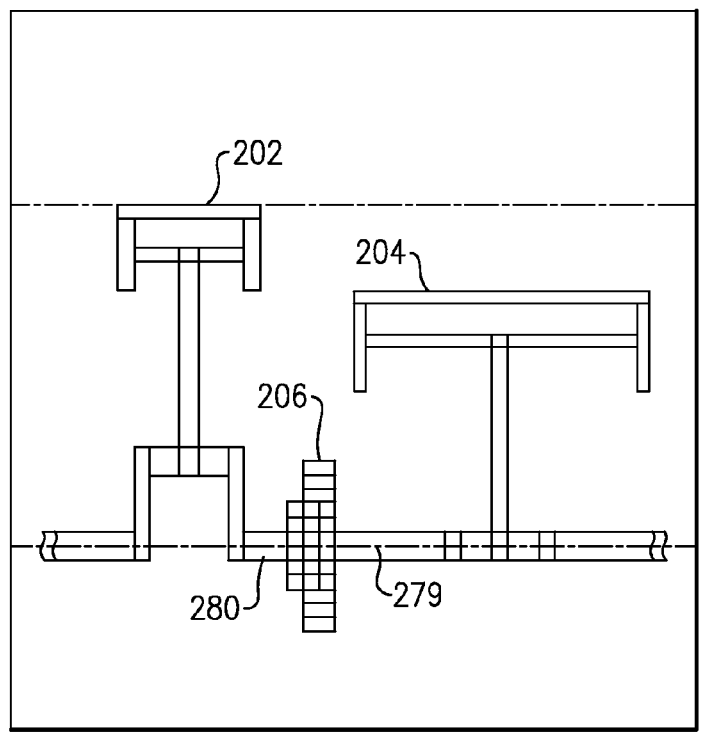
FIG. 4 shows another potential embodiment.

As seen in FIG. 4, four-stroke combustion cylinder 202 drives a crankshaft 280, and a two-stroke expansion cylinder 204 that is powered by exhaust and water as described above, drives a shaft 279. An intermediate two-to-one gear reduction 206 may be a planetary transmission. The gear reduction 206 may be any type of coaxial gear reduction. One example would be a complex planetary gearing system, including more than one planetary gear set to eventually provide a 2:1 reduction, however, other gear reductions can be utilized.

The crankshafts of the two cylinders 202, 204 are mechanically synchronized in this embodiment through gear reduction 206, such that the 360 degree operation of cylinder 204 is effectively expanded to 720 degrees to match the operation of four-stroke cylinder 202. The example arrangement has the heavier reciprocating mass of the two-stroke, secondary power-stroke expansion cylinder 204 now reciprocating at half speed of the lighter, but faster, fuel and air fed four-stroke cylinder 202. The example arrangement has appreciable opportunity for additional thermal-to-mechanical energy extraction through a single cascade.

Figure 5:
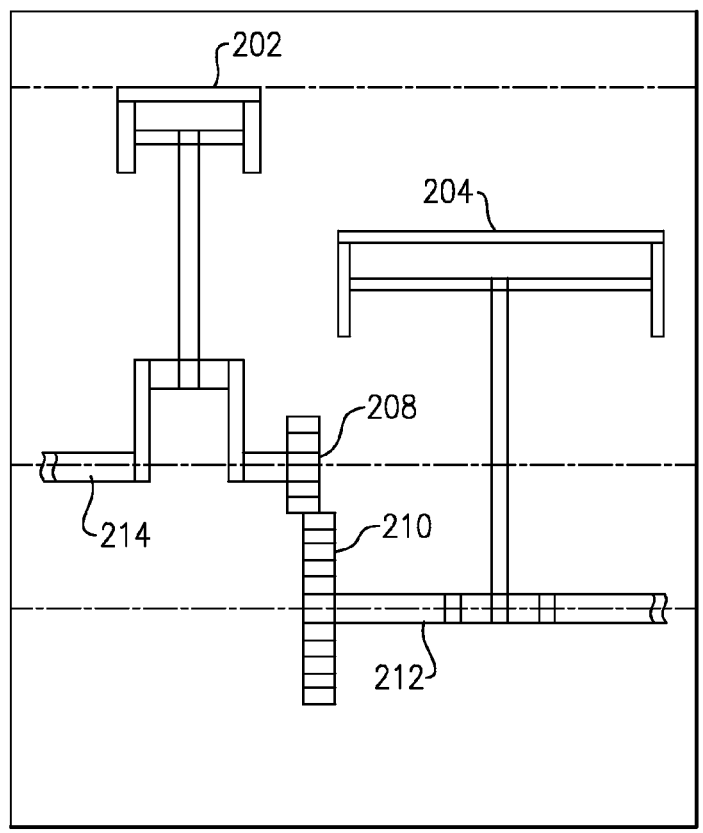
FIG. 5 shows yet another embodiment.

As shown in FIG. 5, an alternative system may use a dual gearing 208 and 210 that achieves the two-to-one gear reduction from the expansion cylinder crankshaft 212 to the crankshaft 214. This may allow the larger displacement requirement of expansion cylinder 204 to be achieved by a longer stroke or a combination of a larger bore and a larger stroke.

The FIG. 4 or 5 arrangements can be used in combined multiple groupings. Also, water injection would preferably be used with these embodiments.

Figure 6:
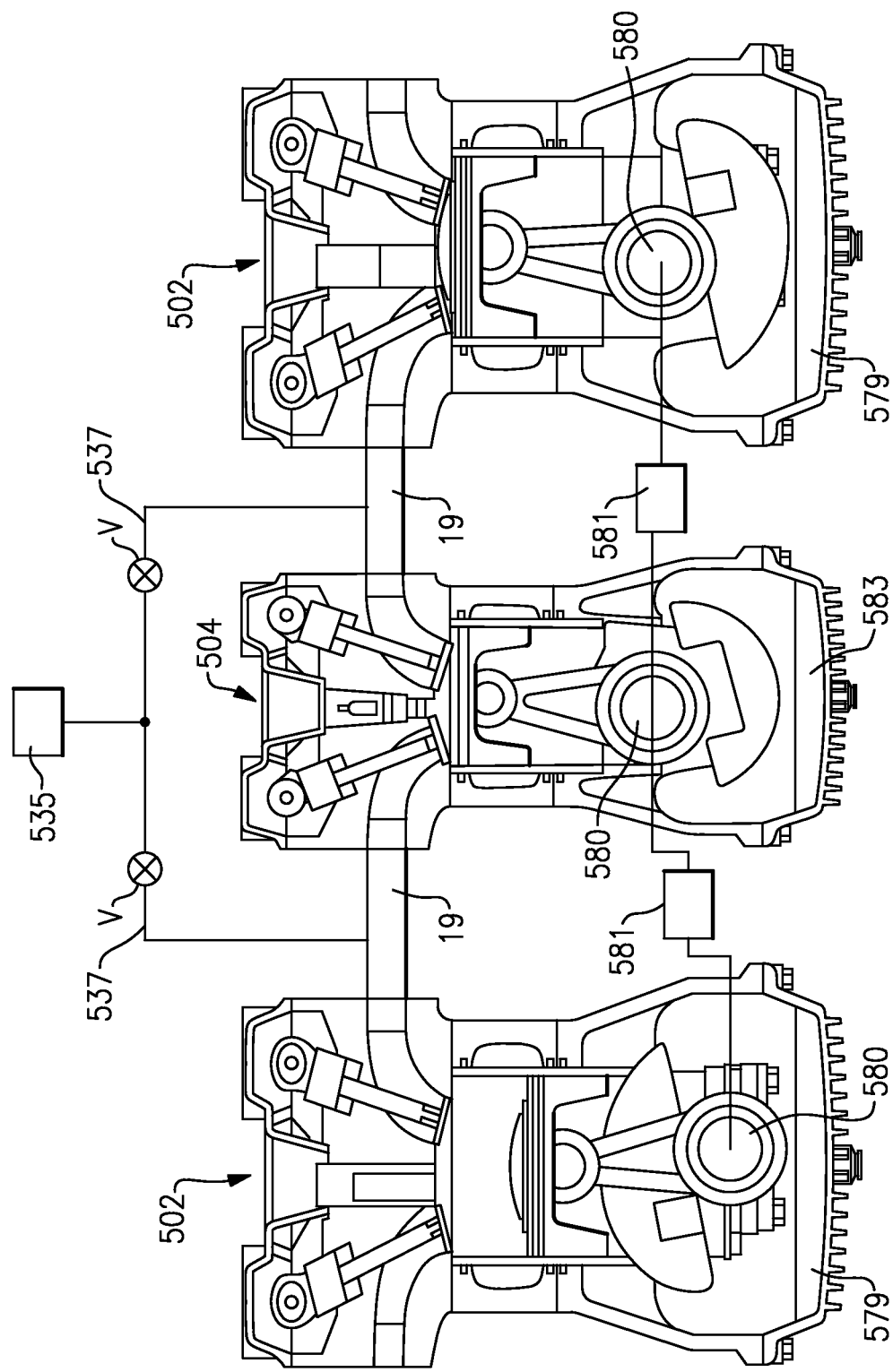
FIG. 6 shows yet another embodiment.

Referring to FIG. 6, two two-stroke secondary power-stroke expansion cylinders 502 can be coupled to one four-stroke combustion cylinder 504 in various different formations. In such formations, the four-stroke cylinder 504 supplies the exhausted gas required for secondary expansion alternately to the two two-stroke secondary power-stroke expansion cylinders 502. In general, the expansion cylinders 502 are driven such that they operate at one-fourth the speed of the piston for the combustion cylinder 504, and are out of phase with each other. A gear reduction 581 is shown schematically connecting their crank portions 580. Typically, the three crank portions will be non-coaxial, although this is not a limitation on this portion of the inventive concepts.

For each two-stroke expansion cylinder 502, there are four quarter-exhaust strokes and four quarter-power strokes for each one thousand fourteen hundred forty degree cycle, or two four-stroke cycles. The first two-stroke cylinder 502 is offset from the second two-stroke cylinder 502, such that when one is in an exhaust stroke, the other is in a power stroke. This allows the four-stroke 504 to feed one two-stroke at a time.

Again, a water supply source 535 may inject water through a line 537 into an exhaust line 19 connecting the single combustion cylinder 504 to each of the expansion cylinders 502.

Of course, as with the earlier embodiments, any number of other locations for water injection may also be utilized.

Again, an oil pan 583 may be maintained separate from water sumps 579.

Figure 7:
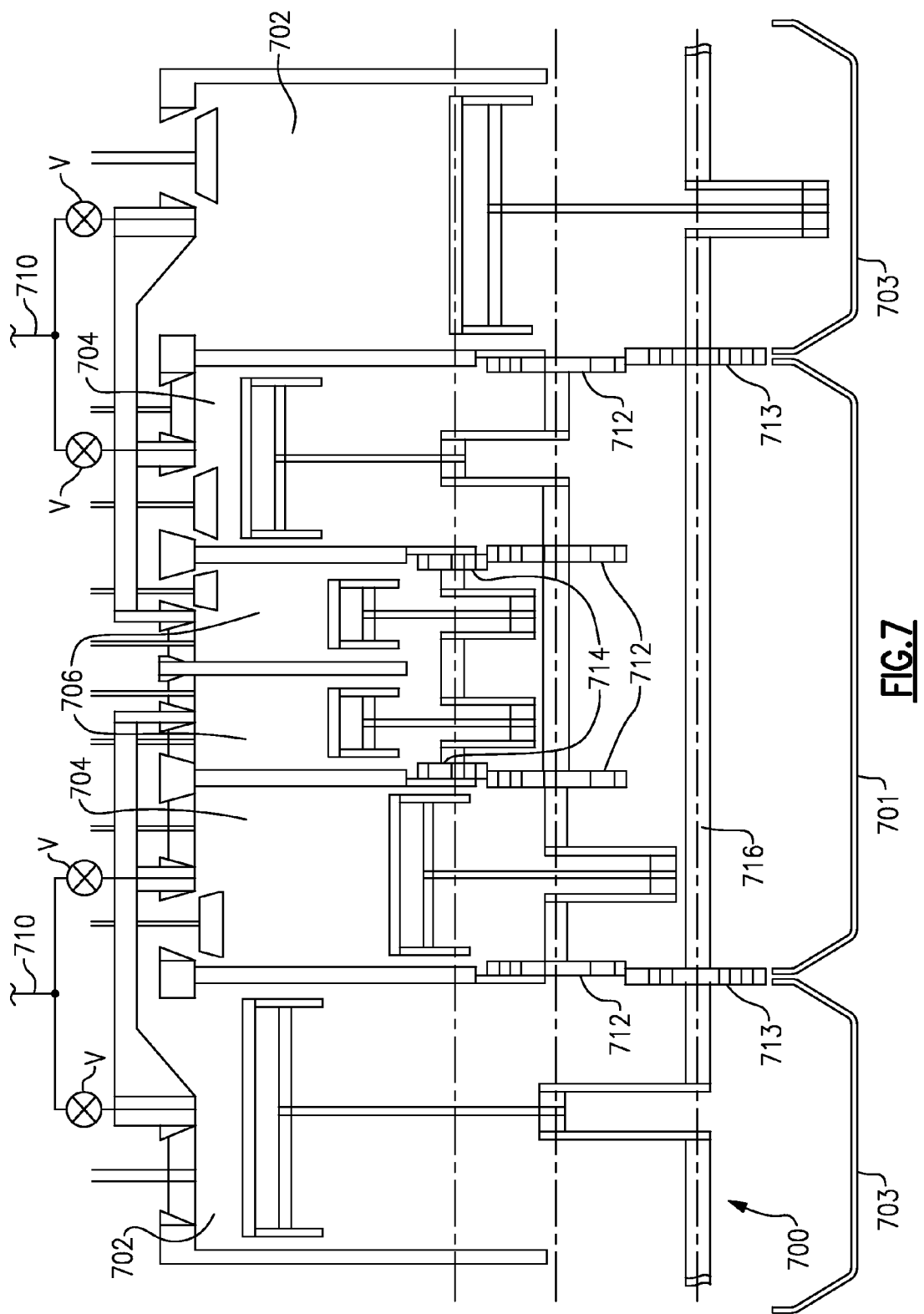
FIG. 7 shows yet another embodiment.

An embodiment 700 is illustrated in FIG. 7. Combustion cylinders 706 generate hot exhaust gas which is passed downstream to a first expansion cylinders 704, and then to second expansion cylinders 702. Each expansion cylinder 704 and 702 has a progressively greater displacement and effective surface area compared to the combustion chambers 706. As shown, gearing 714 drives gear 712 to achieve a first gear reduction, and gear 712 drives a second gear 713. The gear reduction between gears 714 and 712 is selected such that there is a 2:1 step-down. Gears 712 and 713 provide a 1:1 drive arrangement.

The operation of the system may generally be as described above. Again, water injection is shown schematically through a source 710 into the expansion cylinder 702 and 704. Again, water pans 703 may be maintained separate from oil pan 701. However, here oil pan 701 services both combustion cylinders 706 and hot first expansion cylinders 704 while only the second, and final in this example, expansion cylinders 703 are cool enough to be serviced by water pans 703.

In other examples, N-two-stroke expansion cylinders can be coupled to M positioned four-stroke cylinders to create multiple cascades. Here, N and M are arbitrary numbers greater than or equal to 1.

In a similar example, one four-stroke cylinder could feed N-number of two-stroke, secondary-power-stroke expansion cylinders, where N is an arbitrary but generally even number. This creates an adaptable system configuration where the engine wastes little to no heat and the final exhaust temperature is brought to an exceptionally low value. Therefore, the only system energy exit is through the performance of mechanical work. This may allow the elimination of the radiator for an associated vehicle.

High-temperature, water-lubricated polymeric materials may be used in critical places within the construction of the second cascade, such as the outer cylinders 702. For example, the second cascade can have a dense, Teflon-like coating on the interior of the cylinder wall. The type of coating is not limited here. The connecting rod bearings similarly may use dense Teflon for bearing material, although similarly, not limited. The second cascade may be intentionally driven beyond the condensation point, such that water lubrication is available, as water condensation is captured within the engine for re-use. The heat loss by the final exhaust can be managed in this manner down to a negligible level.

Figure 8:
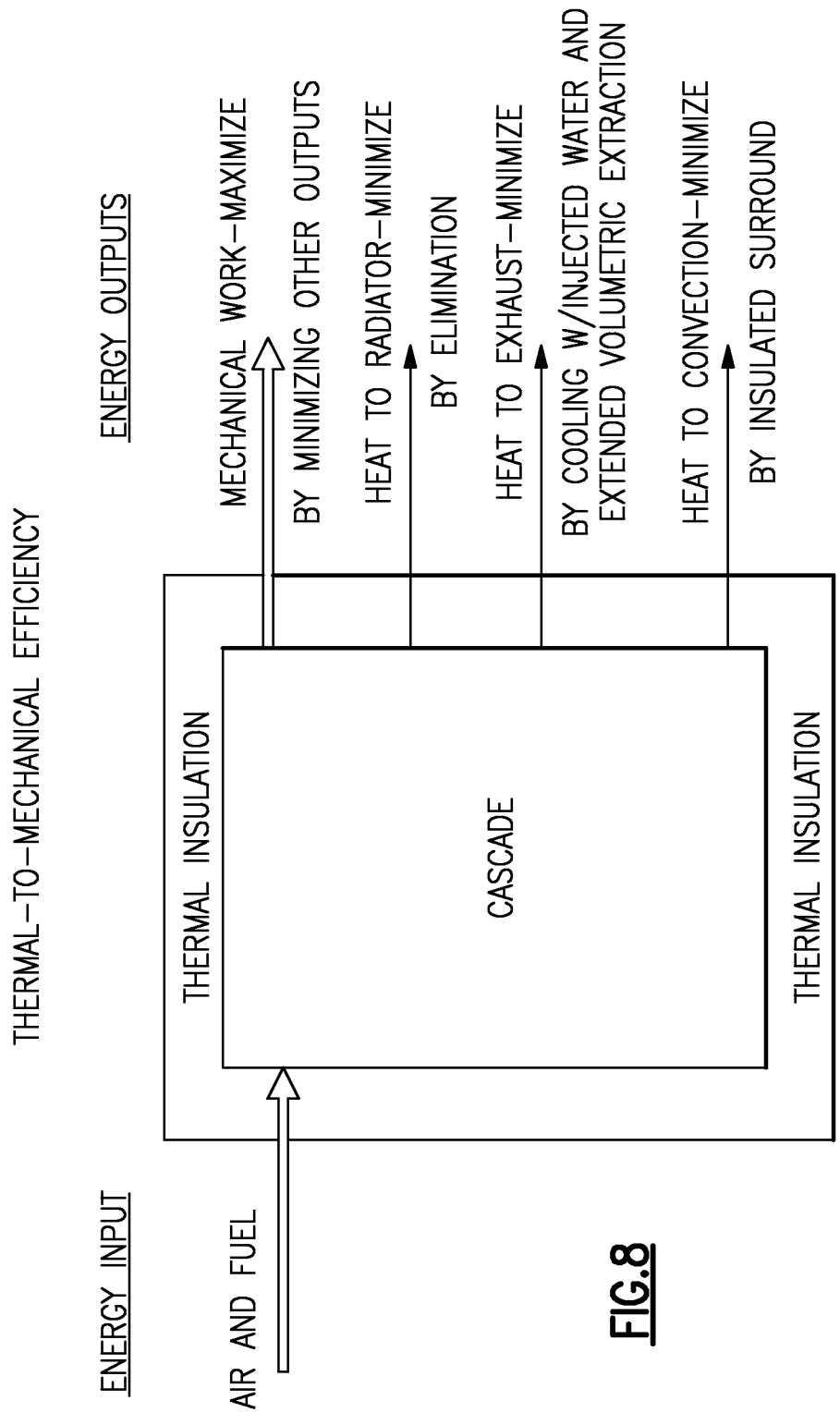
FIG. 8 graphically shows the input versus output for exemplary systems.

FIG. 8 shows a schematic summary of the overall operation of the several above disclosed embodiments. Air and fuel is brought into the system and combusted. Thermal insulation is preferably provided about the engine such that there is minimal heat loss to the environment from the engine. The energy output in a typical engine includes mechanical work, such as driving a crankshaft. The inventive systems are designed to maximize this output.

The prior art systems typically lose heat to a radiator. The inventive systems attempt to minimize any heat to a radiator, and in fact to eliminate any need for a radiator, as will be explained below.

Prior systems lose heat to the exhaust. The inventive systems aim to reduce the temperature of the exhaust to such an extent that there will be little or no heat loss at this location. The same is true with heat loss to convection.

FIG. 9 shows an embodiment 900 of a water cooling system which may be maintained as a closed circuit, and separate from the water injection. In the water cooling system 900, cascade or expansion cylinders 902 are adjacent to a combustion cylinder 904. A water jacket 906 surrounds each of the cylinders. As can be appreciated, fuel, air and water injection lines, consistent with the above-described embodiments, would also extend through the water jacket in actual embodiments. A return line 908 returns water from the water jacket 906 through a flow control valve 910, and to a water pump 912 which recirculates the water. The pump 912 is arranged such that it pulls the water from the vicinity of the combustion cylinder 904, over the expansion cylinders 902. The heat which is captured in the water by cooling a combustion cylinder 904 is partially captured to heat the expansion cylinders 902. An optional heat exchanger 951 may be included which utilizes remaining heat in the return line 908 to heat water in the water injection line 950 heading for the expansion cylinders. However, this heat exchanger is optional, and need not be utilized.

The main requirement for the cooling water jacket to cool the combustion cylinders, and then heat the expansion cylinders, is that the temperature of the cascade or expansion cylinders needs to be lower than the working temperature of the liquid coolant. This requirement can be facilitated by increasing the operating pressure, and therefore temperature, of the liquid coolant system. A temperature sensor 914 can be set such that it will send a signal to a control 916 to allow higher temperatures if such are desirable. While water may be used as the cooling fluid, any number of other coolants may be utilized.

The temperature sensor 914 may provide information back to the control 916 which controls the water valve 910 to ensure adequate water supply to maintain the temperatures as desired.

In addition, the control 916 may be an ignition control input which can control the timing of the ignition for the combustion cylinder 904. In a standard engine, it would not be desirable to slow ignition timing based upon undue temperatures in the system, as this will simply reduce the overall produced useful energy. However, given that the present invention captures a much greater percentage of the useful energy, slowing of ignition timing can be utilized while still capturing sufficient power through the subsequent cascades. Thus, the control 916 may be programmed with an algorithm that will identify an undesirably high temperature at the temperature sensor 914, and slow ignition timing. In this manner, the overall system can be more likely to capture a greater percentage of the useful energy created by combustion.

In general, the control 916 can modulate the ignition timing to achieve tight control over the temperature of the combustion cylinder. A sensed over-temperature condition can be rectified by retarding the ignition timing by one to twenty-five degrees of crank rotation, for example. The exact amount may depend on the size and abruptness of the overall temperature condition. This will transfer some of the heat load to the expansion cylinders, where it can contribute to useful work. This retardation of ignition timing will also reduce the peak temperature and pressure for the benefit of reduction of pollutant generation.

FIG. 10 shows another embodiment 920 wherein the expansion cylinders 902 are positioned to be separated by a thin wall 922 from the combustion cylinder 904. All of the cylinders may be formed in a single block 921. This embodiment may be a passive transfer system that does not include a pump. The liquid jacket 919 surrounding the block 921 may be a sealed container containing any vapor or liquid fluid having good heat transfer properties.

Any number of other ways of transferring heat from the combustion chambers to the expansion chambers may be incorporated into this invention.

With either of the FIGS. 9 and 10 embodiments, the very hot combustion cylinder 904 transfers heat energy to the cascade cylinders 902. The cascade cylinders 902 benefit from this additional heat, as it increases the temperature of the injected water environment to produce additional steam, and allows the recapture of this heat energy.

By capturing and transferring the heat in this manner, the system is able to reduce the exhaust gas and water from the most downstream cascade cylinder to such an extent that no radiator may be necessary.

Figure 11:
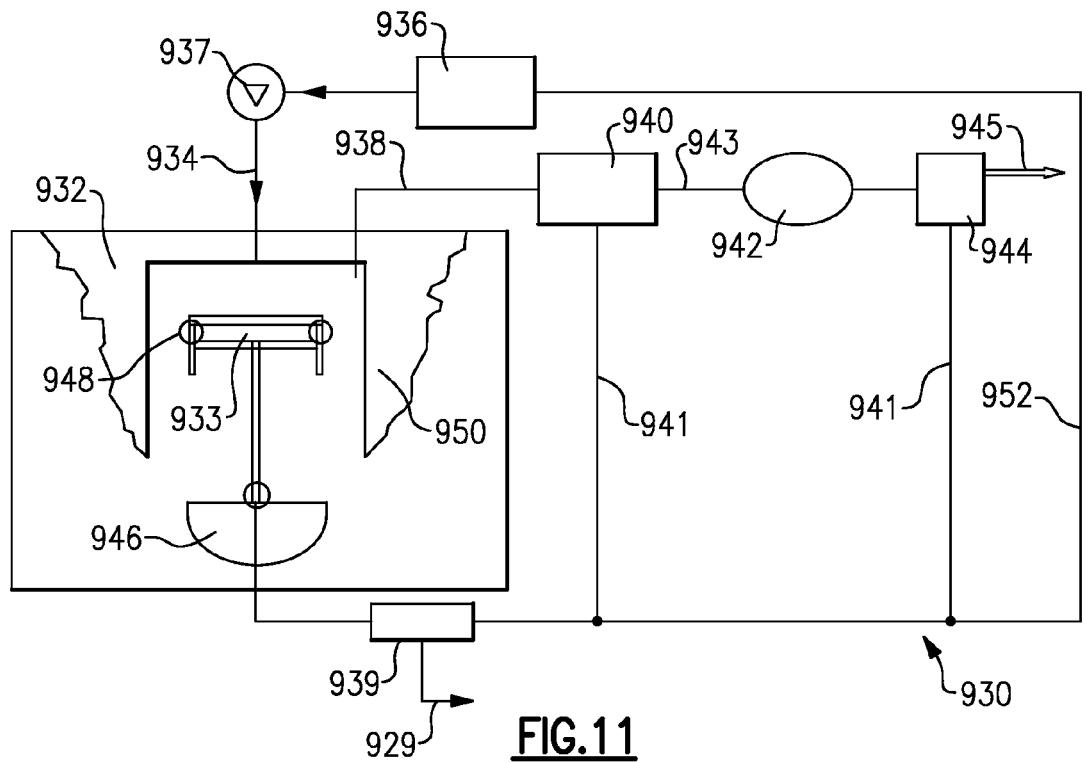
FIG. 11 shows a water recovery system.

FIG. 11 shows a water recovery system 930. When utilized in a system, and in particular in a mobile vehicle system, the source of water to be injected must be contained within a tank 936 associated with the vehicle. The system 930 has a cylinder 932 provided with a piston 933 driven to expand from exhaust and water expansion, as are found in any of the embodiments described above. An exhaust 938 of this system passes through a water scrubber or water trap 940 which returns water through a line 941, and passes exhaust gases downstream through a line 943. More than one phase of water scrubbing may be provided. Eventually, the exhaust gas may reach a muffler 942. Muffler 942 may be provided with yet another scrubber 944 which passes the final exhaust gas through line 945 to atmosphere, and returns water through yet another water return line 941 to an overall water return line 952. Scrubber 944 may be included within the muffler housing or attached downstream.

The piston 933 is provided with piston seals 948 which may provide a loose seal with an internal surface 950 of the expansion cylinder 932. The amount of "clearance" is exaggerated in this Figure to show the fact of the clearance. The crankcase 946 for the expansion cylinder may be separated from oil such that the expansion cylinder components are lubricated only by this water. The water-containing crankcase may be similar to the case 62 in FIG. 1, 579 in FIG. 6, 703 in FIG. 7 or any other arrangement. The use of the loose fit will ensure that a good deal of steam which has been expanded to the point of condensation in the cylinder 932 will fall to the crankcase 946, and be returned through water return line 952 to the water tank 936. A pump 937 may drive the water to the injection line 934 back into the cylinder 932.

The recovery of the water from the crankcase 946 may be only necessary on the most downstream expansion cylinder, however, it can optionally be utilized on more expansion cylinders than simply the most downstream. A water scrubber 939 is shown on the line leading from the crankcase 946, and may remove an exhaust gas 929, similar to the above-described embodiment.

The water scrubbers may be known water traps, and in particular may be chilled or cold water traps of known design. Further, the crankcase drain line can be combined into the exhaust line 938 such that a single set of water scrubbers may be utilized to achieve the above-described features.

By having this detailed water recovery system, the present invention ensures that the source of water will be largely recycled, and that an unduly large water tank will not be necessary.

Across the embodiments, expansion cylinders may be provided in sufficient numbers, such that the final exhaust may be brought to a low temperature, say below 500° F., and in a preferred embodiment, at or below 212° F. When surrounded with high levels of an external insulation, this low temperature exhaust becomes almost entirely the sole source of thermal efficiency loss in steady-state operation. The frictional "loss" of internal moving components also becomes captured within the system so as to be either converted as part of the useful mechanical output or to otherwise be a component of this modest final exhaust emission. These engines may achieve steady-state thermal-to-mechanical efficiencies that are in the range of 94-96%.

Steady-state operation may be characterized by the following rough thermal budget. In a current engine, say a radiator would account for 25% of the thermal budget, while in the described examples accounting for essentially 0%. In a current engine, conduction/convection might account for 25% of the thermal budget whereas in the described examples accounting could be approximately 1-2% of the thermal budget. In a current engine, exhaust may account for 25% of the thermal budget whereas in the described examples may account for approximately 2-3% of the thermal budget. Further, in a current engine, mechanical extraction may account for 25% of the thermal budget where as in the described examples might account for approximately 95% of the thermal budget.

It is believed that there could be back pressure due to the injection of the exhaust gas that could complicate the breathing induction of the combustion cylinders. By injecting water into a cascade cylinder head space after the exhaust gas communication is complete (as an example at the 50% cut-off point for a 2:1 crank synchronization; at the 25% cut-off point for a 4:1 crank synchronization, there will be less back pressure for the exhaust cycle to work into. As another example, should there be a 8:1 speed reduction on the cranks, the above can occur at the 12.5% cut-off point. This will improve the breathing of the combustion cylinder to improve power density, while still allowing the establishment of a steam vaporization pressure front.

Other ways of addressing this breathing concern can be utilized. As an example, the combustion four-stroke cylinder can be RAM charged or super-charged. The combustion cylinder can be of a particularly long stroke, as in a diesel cycle. The combustion cylinder can employ at Atkinson cycle, resulting in a very low cylinder pressure by the end of its power-stroke. The displacement ratio of the expansion cylinder to the combustion cylinder can be designed to be higher than described above. The combustion cylinder can be replaced with a split-cycle pair of cylinders, as has been proposed by Scuderi Motors. Water can be injected into the cascade cylinder head space after the exhaust communication is complete, as described above. Any of these methods of simplifying the breathing/back pressure issue can be utilized.

Figure 12:
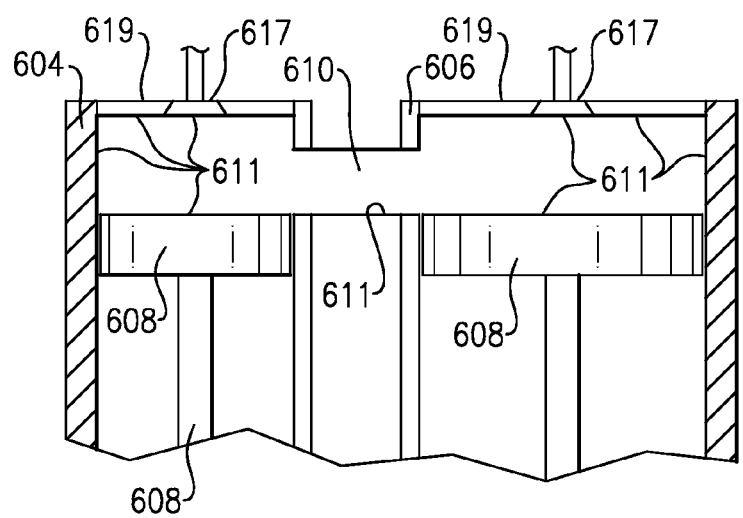
FIG. 12 shows a catalytic conversion system.

Referring to FIG. 12, in one example, components have their surface materials chosen so as to catalyze certain desirable reactions for the benefit of reduced exhaust emissions. A surface within a cylinder assembly could include an inner lining 611 made of a particular surface material designed to have the same catalyzation effect as a catalytic converter. In one embodiment, the cylinder is an expansion cylinder, and more preferably, plural expansion cylinders such as are described above. The surface materials may include but are not limited to: platinum, palladium, rhodium, cerium, iron, and manganese. This example takes advantage of both the enhanced residence time as well as the enhanced surface area, as both increase with an increase in cascaded cylinders, to catalyze reactions that are presently catalyzed in a separate external catalytic converter subsequently eliminating or reducing the need for the converter. As shown in FIG. 12, a first cylinder 604 is associated with a downstream cylinder 606, which is larger. Pistons 608 move within the cylinders 604 and 606. Cylinder head 619 receives valves 617. An exhaust connection 610 connects the two. The lining material

611 can be formed on any, or all, of the interior of the cylinders, the pistons, and the cylinder heads, the valves and in the exhaust passage 610. The catalytic materials can be used on any surface, e.g., fluid flow paths, etc., that will "see" the hot exhaust gas.

In another example, different surface materials for internal environments become required as the final exhaust emission is likely to be much cooler than presently-in-use four-stroke engines, and possibly much lower than desirable for best catalytic reaction kinetics.

Generally, surfaces exposed to the hot gaseous fluid flow may have thermal insulation on the outside of the arrangement, or hot interior-surfaces and structural components may be made of thermally low conductive material. Another alternative would be to maximize heat loss prevention and use a low conductive material that is additionally thermally insulated on the outside. For example, the piston tops have substantial surface area exposed to hot gases, while their bottoms are exposed to crankcase oil. The heat-of-combustion to the displacement volume above the piston top may be confined for thermal-to-mechanical extraction and to avoid heating the crankcase oil. Therefore piston tops made of, for example, a thermally dead ceramic, or ones with a lightweight, crankcase-compatible insulation on the underside, or both, may be used. Another example would be pistons made of normal material, clad bonded with a thermally dead ceramic top surface. Similar concepts could be applied to the valves and valve tops, the hot gaseous-exposed interior-surface of the cylinder-head, the intake passages and exhaust passages from one cylinder to the next in the several above embodiments. This creates a continuous expansion motor with heat energy preserved through all the hot gaseous fluid flow and confined to mechanical energy extraction by the various, and now cascaded, power strokes.

Ultimately, water vapor condensation concerns may limit the minimum desirable final exhaust temperature, but only after a far greater thermal-to-mechanical extraction has been accomplished relative to currently-in-use internal combustions engines. Distilled water may be sufficient for the disclosed purpose, but tap water, or, tap water with a de-calcification/de-crystallization agent alone may also be sufficient. Further, the fuel can carry de-calcification/de-crystallization capability.

Many operating environments will be cold enough to freeze the water, causing a potential problem. However, this is likely manageable using, for example, flexible storage containers that can accommodate freeze expansion or similar technology. The final exhaust can also be used to melt the stored water over the longer operational term and a small high temperature thermal extraction channel from the 4-stroke cylinders can be used to melt water initially for the near term start-up. One other possibility is an electric melt device which is most cost-effective for initial, temporary use.

The combustion cylinder can be made up of, but not limited to, one or more of the following types of fuel and air cylinders including aspirated, fuel injected, carbureted, turbo-charged, super-charged, ram-charged, or any combination of these. The fuel can include, but is not limited to, the use of fuels including gasoline, diesel, propane, natural gas, alcohol, hydrogen, kerosene, or any other fuel known in the art.

In another example, the combustion cylinders may include an Otto four-stroke cylinder, Atkinson four-stroke cylinder, Diesel four-stroke cylinder, or any other known four-stroke cylinder.

While the expansion cylinders have generally been described as two-stroke cylinders, the invention would extend to four-stroke cylinder assemblies.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. An internal combustion arrangement comprising:
   a first cylinder assembly for combusting a mixture of fuel and air;
   a second cylinder assembly configured to drive a crankshaft assembly together with the first cylinder assembly;
   exhaust gas generated during combustion within the first cylinder assembly is used to expand a fluid to at least partially drive a piston within the second cylinder assembly;
   a downstream third cylinder assembly configured to receive exhaust gas from the second cylinder assembly, the fluid also being injected into the third cylinder assembly to expand and at least partially drive a piston within the third cylinder assembly;
   wherein an ignition control slows the ignition timing of the combustion cylinder to reduce the heat generated in the combustion cylinder;
   a water jacket surrounding the first, second and third cylinder assemblies, the water jacket cooling the first cylinder assembly and heating the second and third cylinder assemblies; and
   wherein the ignition control is in communication with a temperature sensor configured to sense a temperature of the arrangement, the ignition control further in communication with a valve controlling a flow of fluid through the cooling jacket, the ignition control controlling the valve in response to the sensed temperature.

* * * * *